United States Patent
Li et al.

(10) Patent No.: US 10,534,658 B2
(45) Date of Patent: Jan. 14, 2020

(54) REAL-TIME MONITORING ALERT CHAINING, ROOT CAUSE ANALYSIS, AND OPTIMIZATION

(71) Applicant: International Business Machines Corporation, Armonk, NY (US)

(72) Inventors: Jin Shan Li, Beijing (CN); Rui Liu, Beijing (CN); Peng Peng Wang, Beijing (CN); Yang Yang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 233 days.

(21) Appl. No.: 15/710,279

(22) Filed: Sep. 20, 2017

(65) Prior Publication Data
US 2019/0087252 A1   Mar. 21, 2019

(51) Int. Cl.
G06F 11/00 (2006.01)
G06F 11/07 (2006.01)
(Continued)

(52) U.S. Cl.
CPC .......... G06F 11/079 (2013.01); G06F 11/076 (2013.01); G06F 11/0709 (2013.01);
(Continued)

(58) Field of Classification Search
CPC combination set(s) only.
See application file for complete search history.

(56) References Cited

U.S. PATENT DOCUMENTS 6,182,249 B1 * 1/2001 Wookey ............... G06F 11/3461
714/37
6,477,667 B1 * 11/2002 Levi ........................ B60R 25/04
714/48
(Continued)

FOREIGN PATENT DOCUMENTS

CN          102625349 B      6/2016

OTHER PUBLICATIONS

Zhihong et al., "Alterclu: A Realtime Alert Aggregation and Correlation System", 2008 International Conference on Cyberworlds, Sep. 2008, 4 pages.
(Continued)

*Primary Examiner* — Amine Riad
(74) *Attorney, Agent, or Firm* — Yee & Associates, P.C.

(57) ABSTRACT

Managing real-time monitoring alerts is provided. An alert is generated for one or more metrics exceeding corresponding defined metric threshold values. A root cause dependency table showing relationships between alerts is retrieved. It is determined whether current real-time metrics are needed from one or more monitoring agents that correspond to dependent alerts not triggered in an alert chain of the generated alert based on information in the root cause dependency table. In response to determining that the current real-time metrics are needed from the one or more monitoring agents that correspond to the dependent alerts not triggered in the alert chain of the generated alert based on the information in the root cause dependency table, the current real-time metrics are requested from the one or more
(Continued)

monitoring agents that correspond to the dependent alerts not triggered in the alert chain.

11 Claims, 9 Drawing Sheets

(51) Int. Cl.
    *H04L 12/24*     (2006.01)
    *G06F 11/30*     (2006.01)
    *G06F 11/34*     (2006.01)

(52) U.S. Cl.
    CPC ...... *H04L 41/0631* (2013.01); *G06F 11/3006* (2013.01); *G06F 11/3476* (2013.01)

(56) References Cited

U.S. PATENT DOCUMENTS

| | | | |
|---|---|---|---|
| 6,707,795 B1* | 3/2004 | Noorhosseini | H04L 41/0631 370/242 |
| 6,871,324 B2* | 3/2005 | Hand | H04L 41/046 709/223 |
| 6,941,557 B1* | 9/2005 | Jakobson | G06F 9/542 709/223 |
| 7,028,228 B1* | 4/2006 | Lovy | G06F 11/3495 714/47.2 |
| 8,204,923 B1* | 6/2012 | Lam | G06F 7/483 708/200 |
| 8,732,516 B2* | 5/2014 | Adams, Jr. | H04L 41/0253 714/4.1 |
| 8,738,972 B1* | 5/2014 | Bakman | G06F 11/0712 714/47.1 |
| 8,751,623 B2 | 6/2014 | Bose et al. | |
| 9,122,602 B1* | 9/2015 | Jewell | G06F 11/079 |
| 9,548,886 B2* | 1/2017 | Gates | G06F 11/0709 |
| 10,263,833 B2* | 4/2019 | Maheshwari | H04L 41/064 |
| 10,291,463 B2* | 5/2019 | Sykes | H04L 41/044 |
| 2003/0084146 A1* | 5/2003 | Schilling | H04L 41/0631 709/224 |
| 2005/0181835 A1* | 8/2005 | Lau | H04L 41/042 455/567 |
| 2006/0015603 A1* | 1/2006 | Jakobson | G06F 9/542 709/223 |
| 2012/0185735 A1* | 7/2012 | Sambamurthy | G06F 11/079 714/47.1 |
| 2014/0129876 A1* | 5/2014 | Addepalli | H04L 41/064 714/37 |
| 2014/0149568 A1 | 5/2014 | Kruempelmann et al. | |
| 2015/0032752 A1* | 1/2015 | Greifeneder | H04L 41/142 707/738 |
| 2015/0170508 A1* | 6/2015 | Lvin | G06F 16/951 340/506 |
| 2015/0172096 A1 | 6/2015 | Sadovsky et al. | |
| 2015/0280968 A1 | 10/2015 | Gates et al. | |
| 2016/0072662 A1 | 3/2016 | Jain et al. | |
| 2017/0104658 A1* | 4/2017 | Sykes | H04L 41/064 |
| 2017/0160733 A1* | 6/2017 | Oostendorp | G08B 21/182 |
| 2017/0235596 A1* | 8/2017 | Vankadaru | G06F 9/45558 718/1 |
| 2017/0237602 A1* | 8/2017 | DAmato | H04L 41/065 709/224 |
| 2018/0152338 A1* | 5/2018 | Panigrahi | H04L 41/0631 |

OTHER PUBLICATIONS

Mell et al., "The NIST Definition of Clound Computing", Computer Security Division, National Institute of Standards and Technology, Jan. 2011, 7 pages.

* cited by examiner

REAL-TIME MONITORING ALERT CHAINING, ROOT CAUSE ANALYSIS, AND OPTIMIZATION

BACKGROUND

1. Field

The disclosure relates generally to cloud environment monitoring and more specifically to managing real-time cloud environment component monitoring alerts in a chain of alerts, analyzing alerts in the chain of alerts to determine a root cause of the alerts having dependent alert relationships, and optimizing a root cause dependency table and a monitoring component corresponding to the cloud environment based on the analysis of the root cause alert chain.

2. Description of the Related Art

A cloud monitoring system may generate thousands of alerts every day, which is known as an "alert storm". It is difficult for system administrators to process all of these alerts. Further, it becomes more difficult for system administrators when there are multiple cloud environments, such as, for example, tens or even hundreds of cloud environments, needing attention based on these alerts. Aggregation and dependency analysis of alerts are straightforward ways to solve the alert storm problem by analyzing historical alert data. However, in a real production system, the alerts based on historical data may be totally inaccurate. Different monitoring intervals of different monitors are a problem in cloud environments. The problem is that static alert aggregation does not provide a full picture of alert dependencies because one or more dependent alerts may not have been triggered yet. Thus, the cloud monitoring system has to wait for outstanding dependent alerts to arrive or send an inaccurate or incomplete root cause alert chain based on the static alert historical data.

Further, noise is another problem in monitoring cloud environments. When alerts are triggered, a downstream alert analysis system may get a multitude of unreasonable or confusing alerts, which are monitoring noise. Furthermore, one alert may be caused by another alert when the two alerts have an alert dependency relationship between them. In addition, several different alerts may be caused by the same problem. For example, all network transactions depend on a network functioning properly. If the network fails, then alerts are sent out to system administrators. However, a system administrator working on solving the network problem would be distracted by receiving a multitude of transaction failure alerts due to the network being down.

SUMMARY

According to one illustrative embodiment, a computer system for managing real-time monitoring alerts is provided. The computer system generates an alert for one or more metrics exceeding corresponding defined metric threshold values. The computer system retrieves a root cause dependency table showing relationships between alerts. The computer system determines whether current real-time metrics are needed from one or more monitoring agents that correspond to dependent alerts not triggered in an alert chain of the generated alert based on information in the root cause dependency table. In response to the computer system determining that the current real-time metrics are needed from the one or more monitoring agents that correspond to the dependent alerts not triggered in the alert chain of the generated alert based on the information in the root cause dependency table, the computer system requests the current real-time metrics from the one or more monitoring agents that correspond to the dependent alerts not triggered in the alert chain. According to another illustrative embodiment, a computer program product for managing real-time monitoring alerts is provided.

DETAILED DESCRIPTION

Figure 1:
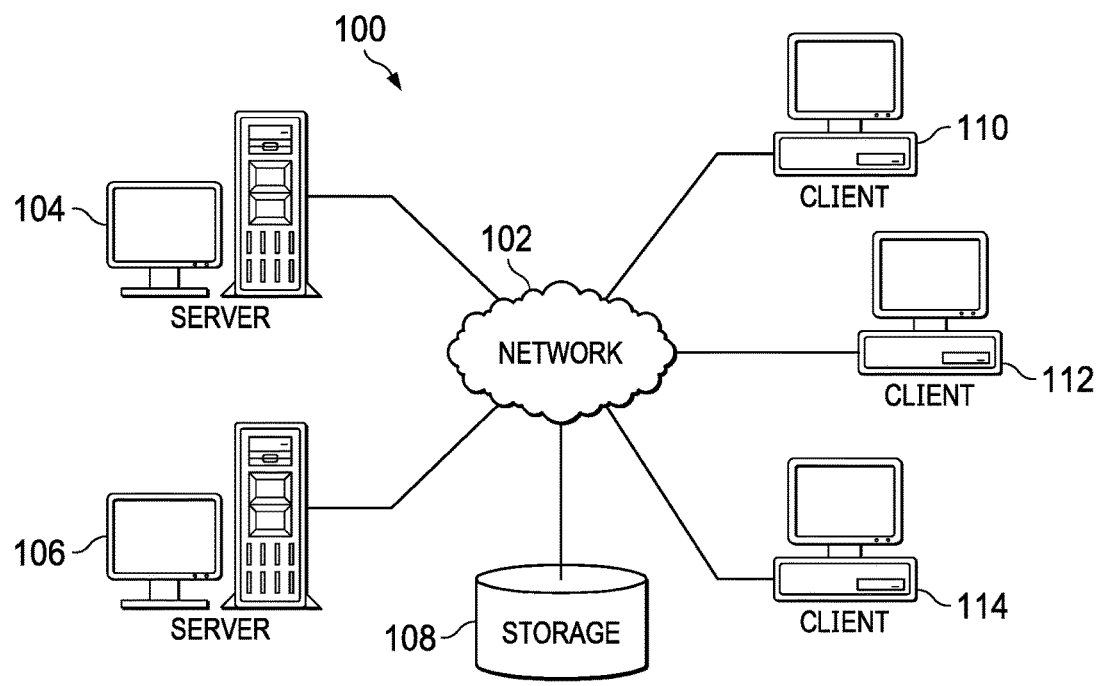
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide services for managing real-time monitoring alerts by analyzing alerts in a chain of alerts to determine a root cause of the alerts having dependent alert relationships based on a root cause dependency table. A root cause dependency table identifies relationships among dependent monitoring alerts. Also, it should be noted that server 104 and server 106 may each represent a plurality of different servers providing alert management services to clients.

Client 110, client 112, and client 114 also connect to network 102. Clients 110, 112, and 114 are clients of server 104 and server 106. In addition, server 104 and server 106 may provide information, such as boot files, operating system images, software applications, and client component monitoring agents to clients 110, 112, and 114. Server 104 and server 106 utilize the monitoring agents to collect different performance metrics corresponding to the different components of clients 110, 112, and 114 to determine if the components are working properly (e.g., without fault or issue).

In this example, clients 110, 112, and 114 are shown as desktop or personal computers. However, it should be noted that clients 110, 112, and 114 are intended as examples only. In other words, clients 110, 112, and 114 may include other types of data processing systems, such as, for example, network computers, laptop computers, tablet computers, handheld computers, smart phones, smart watches, smart televisions, smart vehicles, smart wearable devices, such as smart glasses and smart exercise tracking devices, smart implants, such as smart heart monitors and pacemakers, personal digital assistants, gaming devices, kiosks, and the like. Further, it should be noted that clients 110, 112, and 114 may each represent a different cloud environment comprising a plurality of different data processing system devices.

Storage 108 is a network storage device capable of storing any type of data in a structured format or an unstructured format. In addition, storage 108 may represent a plurality of network storage devices. Further, storage 108 may store a plurality of defined metric threshold values corresponding to a plurality of different client component performance metrics; lists of client components to be monitored; lists of monitoring agents corresponding to the client components; names and identifiers for a plurality of client devices; root cause alert chains; root cause dependency tables, and the like. Furthermore, storage unit 108 may store other types of data, such as authentication or credential data that may include user names, passwords, and biometric data associated with system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
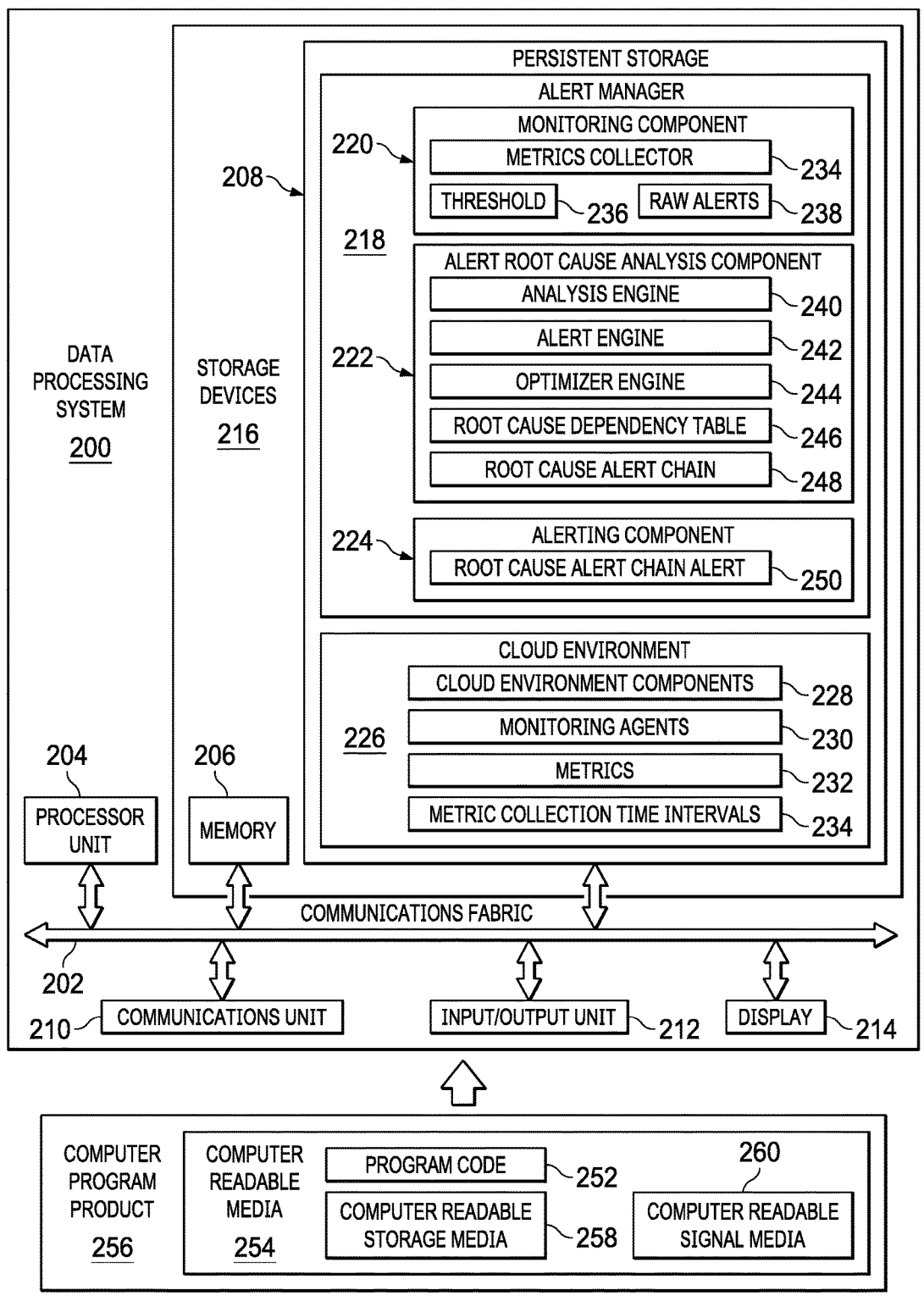
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores alert manager 218. However, it should be noted that even though alert manager 218 is illustrated as residing in persistent storage 208, in an alternative illustrative embodiment alert manager 218 may be a separate component of data processing system 200. For example, alert manager 218 may be a hardware component coupled to communication fabric 202 or a combination of hardware and software components. In another alternative illustrative embodiment, a first portion of the components of alert manager 218 may be located in data processing system 200 and a second portion of the components of alert manager 218 may be located in a client device, such as client 110 in FIG. 1.

Alert manager 218 manages real-time cloud environment component monitoring alerts in a chain of alerts, analyzes the alerts in the chain to determine a root cause of the alerts having dependent alert relationships, and optimizes a root cause dependency table and a monitoring component based on the analysis of the root cause alert chain. In this example, alert manager 218 includes monitoring component 220, alert root cause analysis component 222, and altering component 224. Cloud environment 226 represents a description of cloud environment components 228 that comprise cloud environment 226. Cloud environment components 228 represent a plurality of different components, such as, for example, computers, routers, data processing systems, storage devices, applications, services, networks, and the like, within cloud environment 226.

Monitoring agents 230 represent a plurality of monitoring agents that collect metrics 232 corresponding to each of cloud environment components 228. Metrics 232 represent performance metrics collected by monitoring agents 230 during operation of cloud environment components 228. In other words, metrics 232 measure whether a cloud environment component is performing or operating within normal limits without issue or fault. In addition, the different metrics may be captured at different time intervals. Also, it should be noted that monitoring agents 230 may perform intrusive or non-intrusive monitoring.

Monitoring agents 230 collect metrics 232 at metric collection time intervals 234. Metric collection time intervals 234 represent a plurality of different specified metric collection times when monitoring agents 230 are to collect metrics 232. It should be noted that the plurality of different specified metric collection times may not occur at the same time. In other words, the specified time for collecting metrics from one cloud environment component may be different from the specified time for collecting metrics from another cloud environment component.

Monitoring component 220 utilizes metrics collector 234 to retrieve metrics 232 from monitoring agents 230 corresponding to cloud environment components 228 in cloud environment 226. Metrics collector 234 processes metrics 232 by comparing metrics 232 to thresholds 236. Thresholds 236 represent a plurality of defined metric threshold values that correspond to each metric in metrics 232. When metrics in metrics 232 meet or exceed a corresponding metric threshold value in thresholds 236, metrics collector generates raw alerts 238 for the out-of-range metrics. Metrics collector 234 sends raw alerts 238 to alert root cause analysis component 222.

Alert root cause analysis component 222 includes analysis engine 240, alert engine 242, and optimizer engine 244. Alert root cause component 222 utilizes analysis engine 240 to process raw alerts 238 based on root cause dependency table 246 to identify the underlying dependencies between alerts. Root cause dependency table 246 represents a logical table that describes dependent relationships between alerts. In addition, root cause dependency table 246 may represent a plurality of different root cause dependency tables corresponding to a plurality of different cloud environments. If analysis engine 240 determines that current real-time metrics are needed to generate root cause alert chain 248 based on analyzing root cause dependency table 246, then analysis engine 240 initiates a metric collection request to alert engine 242. Alert engine 242 sends the metric collection request to corresponding monitoring agents, whose metric collection time intervals haven't been reached yet, to collect the current real-time metrics from corresponding cloud components.

After receiving and processing the additional metric data, analysis engine 240 generates root cause alert chain 248. Root cause alert chain 248 represents a chain identifying alert dependencies and their corresponding metric collection time sequences. In other words, root cause alert chain 248 is complete containing information regarding all alerts in the chain regardless of having different metric collection time intervals. Analysis engine 240 sends root cause alert chain 248 to optimizer engine 244. Optimizer engine 244 utilizes root cause alert chain 248 to learn the latest dependency relationships between alerts. After learning the latest dependency relationships between alerts, optimizer engine 244 optimizes root cause dependency table 246 by updating root cause dependency table 246 to include the latest dependency relationships between alerts. Further, when optimizer engine 244 determines that particular alerts are triggered too often or too many times (e.g., too often or many times for system administrators to properly process) within a pre-defined period of time, optimizer engine 244 adjusts corresponding metric threshold levels in metrics collector 234 to reduce the number of triggered alerts.

Analysis engine 240 also sends root cause alert chain 248 to alert engine 242. Alert engine 242 forwards root cause alert chain 248 to alerting component 224. Alerting component 224 generates root cause alert chain alert 250, which includes root chain alert chain 248. Alerting component 224 transmits root cause alert chain alert 250 to one or more system administrators for further analysis via email, page, and/or real-time message.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 252 is located in a functional form on computer readable media 254 that is selectively removable and may be loaded onto or transferred to data processing system 200 for running by processor unit 204. Program code 252 and computer readable media 254 form computer program product 256. In one example, computer readable media 254 may be computer readable storage media 258 or computer readable signal media 260. Computer readable storage media 258 may include, for example, an optical or magnetic disc that is inserted or placed into a drive or other device that is part of persistent storage 208 for transfer onto a storage device, such as a hard drive, that is part of persistent storage 208. Computer readable storage media 258 also may take the form of a persistent storage, such as a hard drive, a thumb drive, or a flash memory that is connected to data processing system 200. In some instances, computer readable storage media 258 may not be removable from data processing system 200.

Alternatively, program code 252 may be transferred to data processing system 200 using computer readable signal media 260. Computer readable signal media 260 may be, for example, a propagated data signal containing program code 252. For example, computer readable signal media 260 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 252 may be downloaded over a network to persistent storage 208 from another device or data processing system through computer readable signal media 260 for use within data processing system 200. For instance, program code stored in a computer readable storage media in a data processing system may be downloaded over a network from the data processing system to data processing system 200. The data processing system providing program code 252 may be a server computer, a client computer, or some other device capable of storing and transmitting program code 252.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 258 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
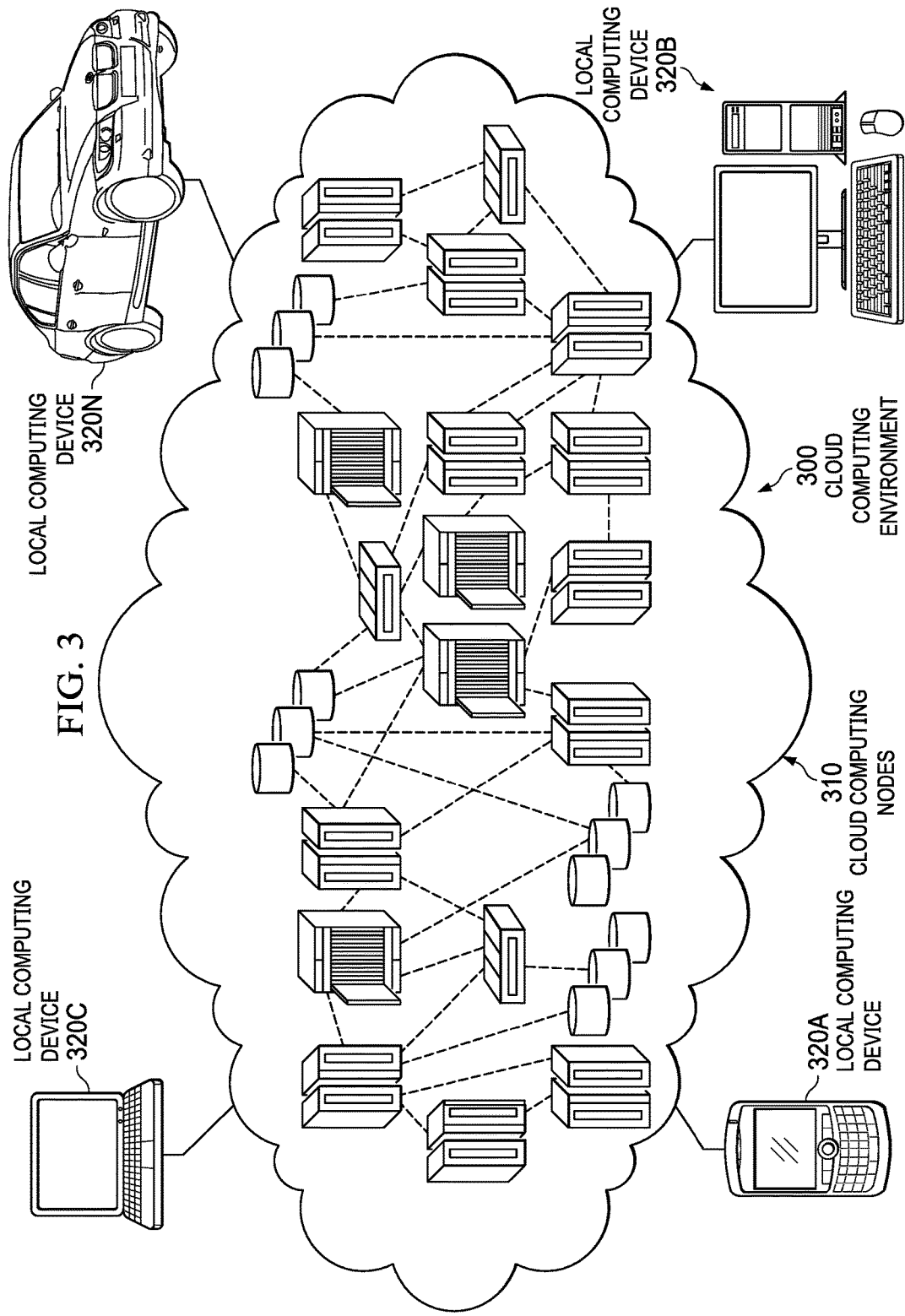
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
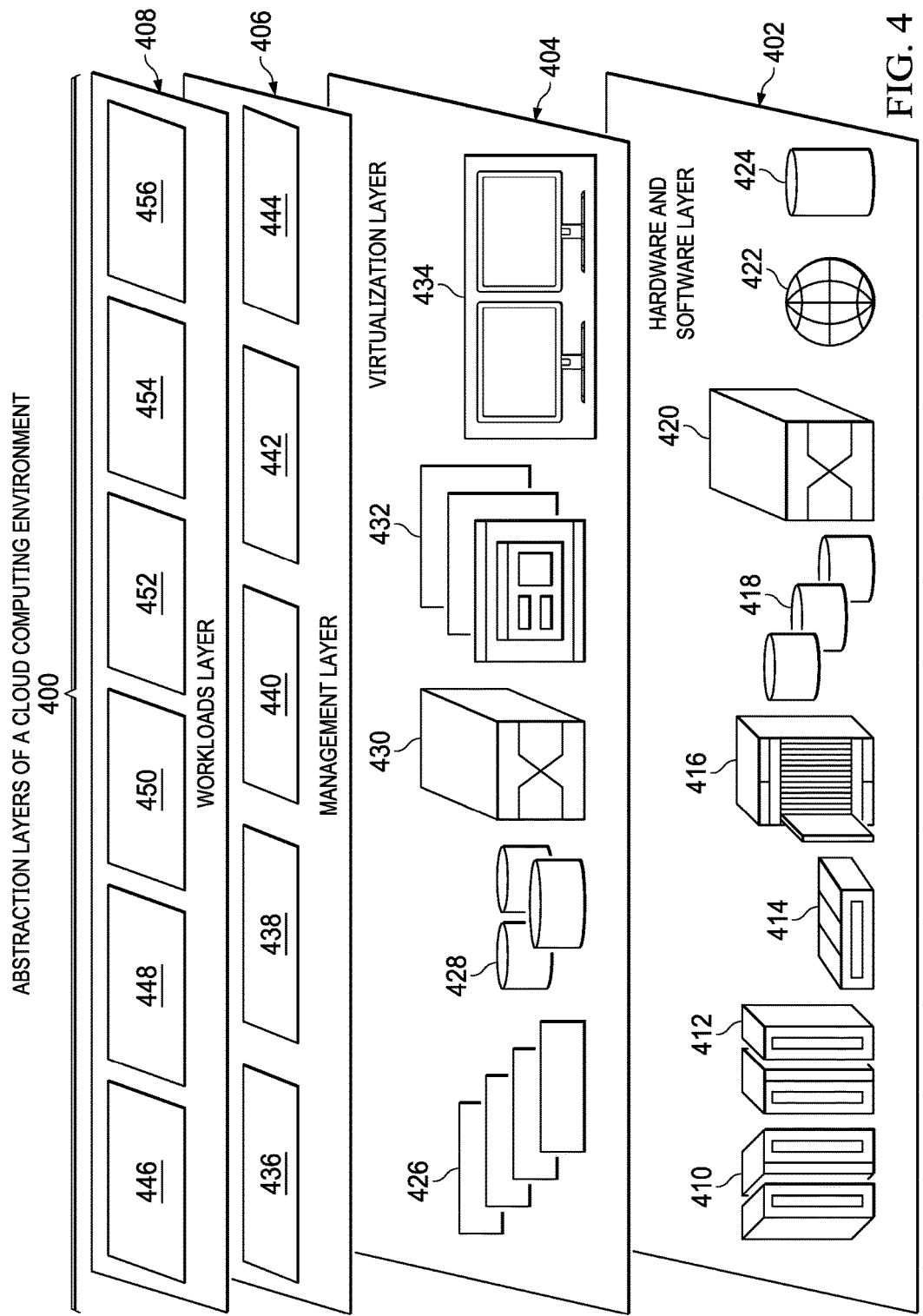
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 includes hardware and software layer 402, virtualization layer 404, management layer 406, and workloads layer 408.

Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and real-time monitoring alert processing 456.

In the course of developing illustrative embodiments, it was discovered that it is unacceptable to receive a monitoring alert regarding an occurrence of a critical component failure within a cloud environment and hold that critical alert in an alert management system while waiting for more monitoring data from other monitoring agents in order to generate a complete root cause failure graph corresponding to the cloud environment. For example, imagine a chain of dependent alerts where alert B may be caused by alert A and alert C and alert C may be caused by alert D. However, all four of the monitoring agents corresponding to these four alerts are running on different metric collection time intervals. For example, alert A at current time interval A3 and alert C at current time interval C2 are triggered at approximately a same time and are received by the alert management system. However, because different metric collection time intervals exists for the different monitoring agents, the alert management system is not able to determine if cloud components corresponding to alert B at future time interval B2 and alert D at future time interval D2 are experiencing problems, such as a fault. As a result, the alert management system has a dilemma. For example, if the alert management system sends out an alert notification with the alert chain of A-C-B-D, potential false alerting exists for the cloud components corresponding to alerts B and D since the current status of these cloud components corresponding to alerts B and D has not been ascertained as the metric collection time intervals have not been reached yet. Alternatively, if the alert management system waits for the metric collection time intervals for the monitoring agents corresponding to alerts B and D to be reached, metrics for the cloud components collected, and alert chain generated before sending out the alert notification, then the alert management system may miss immediately sending out a critical alert (e.g., alert A) because the alert management waited for more metrics to be collected and processed.

Illustrative embodiments generate raw alerts corresponding to components within a cloud environment to produce accurate root cause alert chains in real-time. The real-time root cause alert chains provide feedback for optimizing a root cause dependency tables and dynamically adjusting metric threshold values corresponding to monitored metrics within the cloud environment to produce more accurate alerts.

Illustrative embodiments utilize a cloud monitoring component to collect metrics from monitoring agents corresponding to the components within the cloud environment and generate the raw alerts based on one or more collected performance metrics meeting or exceeding defined metric threshold values. Illustrative embodiments utilize an analysis engine to analyze these generated raw alerts using a root cause dependency table and determine whether one or more monitoring agents in the cloud environment need to perform a real-time monitoring event (i.e., collect current real-time data corresponding to certain cloud components). For example, if the analysis engine has not received one or more alerts in a dependency alert chain, then the analysis engine sends a monitoring event request to an alert engine.

The alert engine then instructs one or more particular monitoring agents in the cloud environment, which correspond to the one or more dependent alerts not yet received, to collect and send the current real-time data. After receiving the current real-time data from these particular monitoring agents, the analysis engine then has all of the real-time alerts in the dependency root cause alert chain. The analysis engine sends the dependent root cause alert chain to the alert engine and instructs the alert engine to send the dependency root cause alert chain to an alerting component.

The alerting component sends the dependency root cause alert chain to one or more system administrators via email, page, and/or real-time messaging. The analysis engine also sends the dependent root cause alert chain to an optimizer engine. The optimizer engine may, for example, dynamically adjust defined metric threshold values, adjust the configuration of monitoring agents to reduce duplicated or known alerts in terms of reducing the monitoring load on the cloud monitoring component and reducing alert noise, disable certain monitoring agents, update the existing root cause dependency table with current alert dependencies, or any combination thereof.

Thus, illustrative embodiments reduce the number of alerts and help system administrators to focus on the real problems in the cloud environment. It should be noted that illustrative embodiments may receive alerts corresponding to different layers of the cloud environment, such as, for example, a network layer, an infrastructure layer, a storage layer, a platform layer, an application layer, a service layer, and the like. Furthermore, it should be noted that illustrative embodiments initially generate the root cause dependency table based on a multitude of historical alert data.

In contrast with existing alert management systems, illustrative embodiments not only chain dependent alerts based on generated raw alerts, illustrative embodiments also proactively retrieve additional metric data based on the root cause dependency table to determine the root cause of the alerts in the chain. Further, in contrast with existing alert management system, illustrative embodiments dynamically adjust configurations of monitoring agents to generate more accurate alerts.

Figure 5:
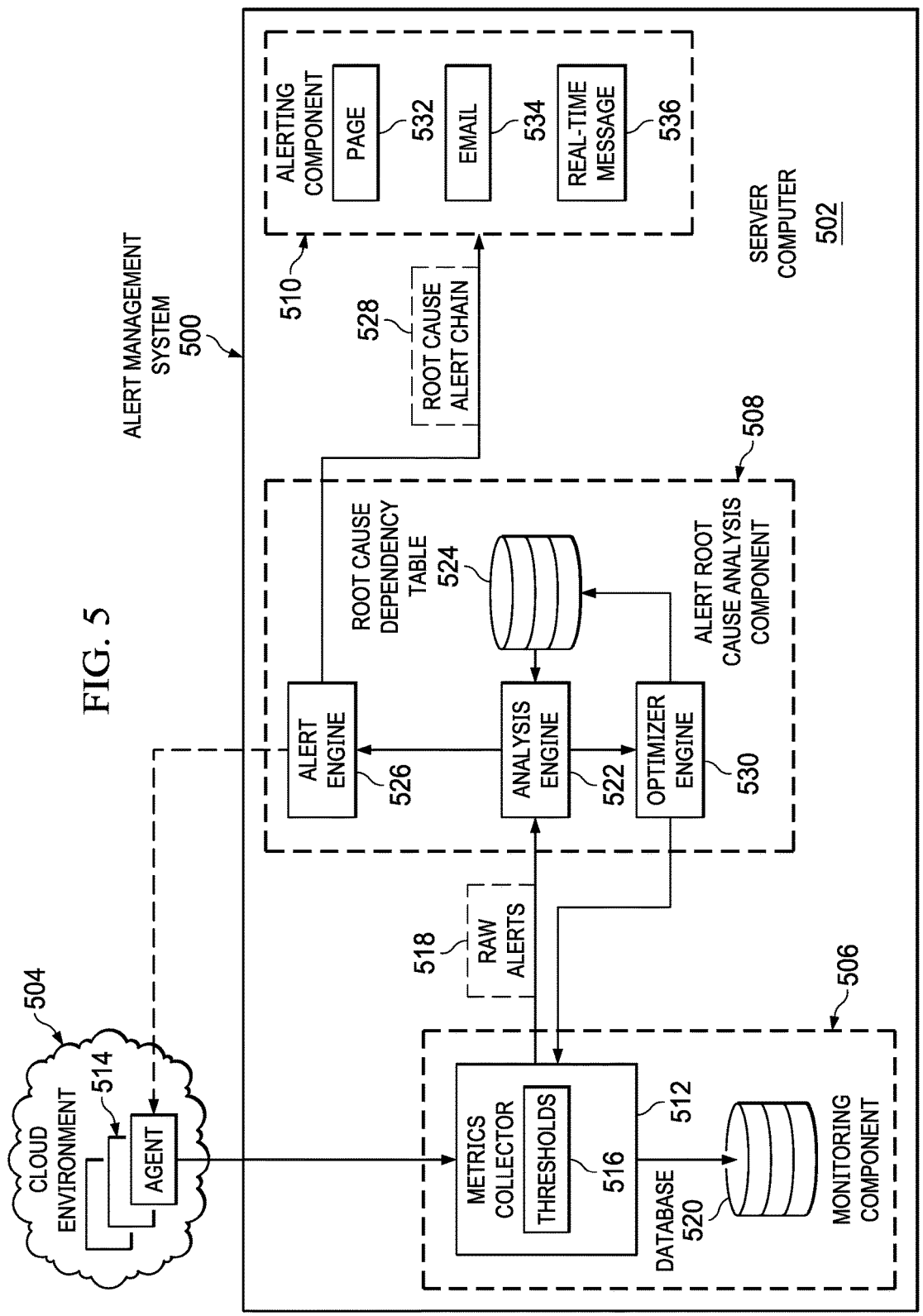
FIG. 5 is a diagram illustrating an example of an alert management system in accordance with an illustrative embodiment.

With reference now to FIG. 5, a diagram illustrating an example of an alert management system is depicted in accordance with an illustrative embodiment. Alert management system 500 may be implemented in a network of data processing systems, such as network data processing system 100 in FIG. 1, or a cloud computing environment, such as cloud computing environment 300 in FIG. 3. Alert management system 500 is a system of hardware and software components for managing real-time cloud environment component monitoring alerts in a chain of alerts, analyzing alerts in the chain to determine a root cause of the alerts having dependent alert relationships, and optimizing a root cause dependency table and monitoring agents corresponding to the cloud environment based on the analysis of the root cause alert chain.

In this example, alert management system 500 includes server computer 502 and cloud environment 504. Server 502 may be, for example, server 104 in FIG. 1, data processing system 200 in FIG. 2, or a cloud computing node in cloud computing nodes 310 in FIG. 3. Server computer 502 includes monitoring component 506, alert root cause analysis component 508, and alerting component 510. Monitoring component 506, alert root cause analysis component 508, and alerting component 510 may be, for example, monitoring component 220, alert root cause analysis component 222, and alerting component 224 in FIG. 2.

Monitoring component 506 utilizes metrics collector 512 to retrieve performance metrics corresponding to cloud components within cloud environment 504 from monitoring agents 514. It should be noted that different monitoring agents 514 collect different cloud component performance metrics at different metric collection time intervals. Metrics collector 512 compares the received performance metrics against thresholds 516. Thresholds 516 represent a plurality of different metric threshold values corresponding to different performance metrics.

In response to metrics collector 512 determining that received performance metrics meet or exceed thresholds 516, metrics collector 512 generates raw alerts 518. In addition, metrics collector 512 may store the received performance metrics and raw alerts 518 in database 520 for later reference and analysis. Subsequently, metrics collector 512 sends raw alerts 518 to analysis engine 522.

Analysis engine 522 utilizes root cause dependency table 524 to analyze raw alerts 518 to determine whether dependent alerts corresponding to raw alerts 518 have not yet been received (e.g., the metric collection intervals corresponding to these dependent alerts have not been reached yet). After analysis engine 522 determines that the metric collection intervals corresponding to these dependent alerts have not been reached yet, analysis engine 522 sends a request to alert engine 526 to collect current real-time performance metrics from particular monitoring agents in monitoring agents 514 corresponding to the dependent alerts not yet received.

After analysis engine 522 receives raw alerts from metric collector 512 regarding the current real-time performance metrics from the particular monitoring agents corresponding to the dependent alerts, analysis engine 522 generates root cause alert chain 528. Analysis engine 522 sends root cause alert chain 528 to alert engine 526 and, in turn, alert engine 526 forwards root cause alert chain 528 to alerting component 510. Alerting component 510 sends root cause alert chain 528 in an alert to one or more system administrators via one or more of page 532, email 534, and real-time message 536.

Analysis engine 522 also sends root cause alert chain 528 to optimizer engine 530. Optimizer engine 530 analyzes root cause alert chain 528 to discover current alert dependencies. Based on the discovered current alert dependencies, optimizer engine 530 updates root cause dependency table 524 and adjusts thresholds 516.

Figure 6:
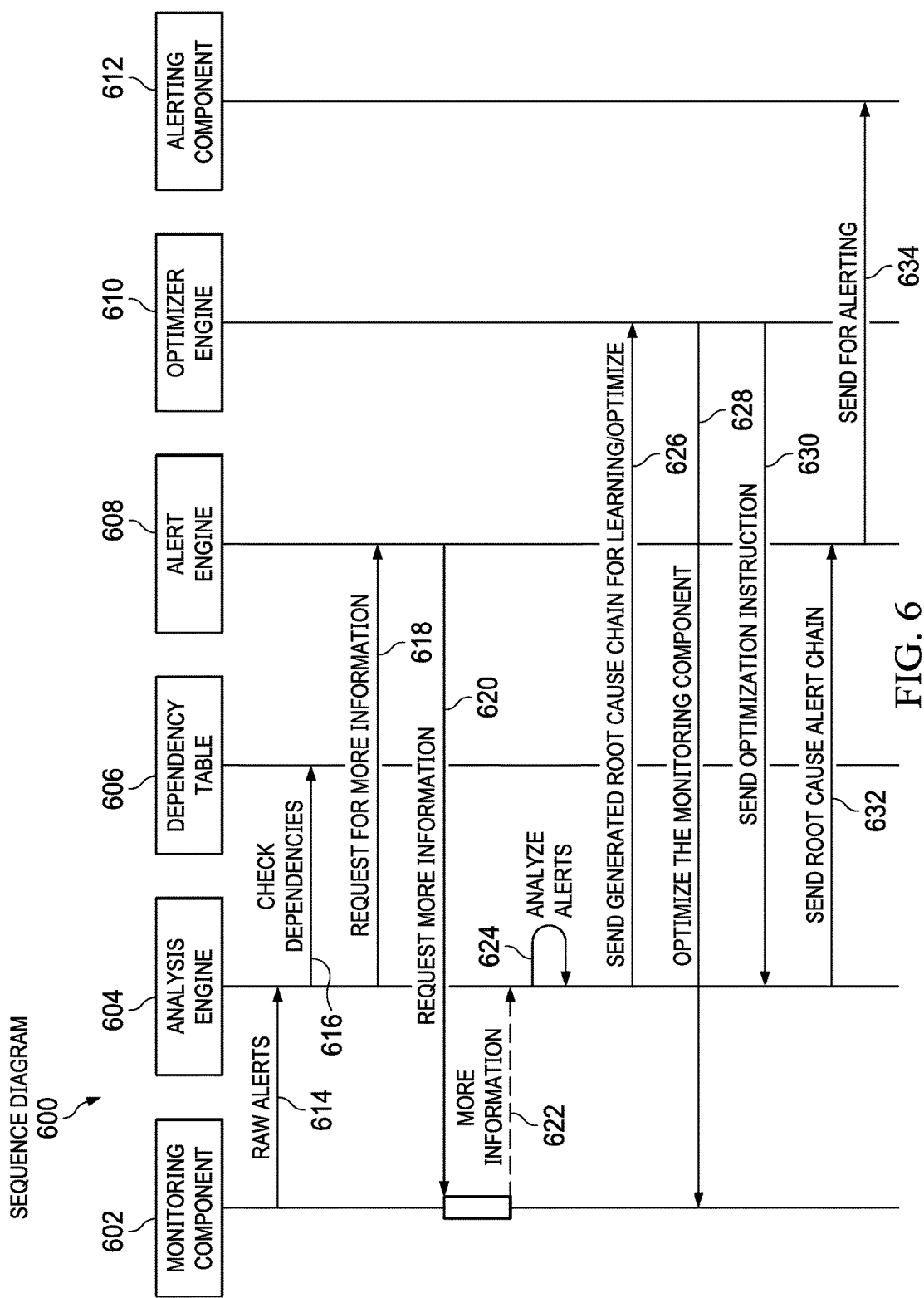
FIG. 6 is a sequence diagram illustrating a process for managing real-time monitoring alerts in accordance with an illustrative embodiment.

With reference now to FIG. 6, a sequence diagram illustrating a process for managing real-time monitoring alerts is shown in accordance with an illustrative embodiment. Sequence diagram 600 may be implemented in an alert management system, such as alert management system 500 in FIG. 5. Sequence diagram 600 shows an example sequence of events corresponding to monitoring component 602, analysis engine 604, dependency table 606, alert engine 608, optimizer engine 610, and alerting component 612. Monitoring component 602, analysis engine 604, dependency table 606, alert engine 608, optimizer engine 610, and alerting component 612 may be, for example, monitoring component 506, analysis engine 522, root cause dependency table 524, alert engine 526, optimizer engine 530, and alerting component 510 in FIG. 5.

At 614, monitoring component 602 sends raw alerts to analysis engine 604. Analysis engine 604 checks for alert dependencies at 616 using dependency table 606. Based on information obtained during the alert dependency check performed at 616, analysis engine 604 sends a request for more metric information at 618 to alert engine 608. In turn, alert engine 608 forwards the request for more metric information at 620 to monitoring component 602.

At 622, monitoring component 602 collects the requested additional metric information from monitoring agents and sends the requested additional metrics to analysis engine 604. At 624, analysis engine 604 analyzes the requested additional metrics to determine whether the requested additional metrics trigger one or more additional raw alerts. Based on the analysis performed at 624, the analysis engine sends a generated root cause alert chain at 626 to optimizer engine 610 for learning alert dependencies within an alert chain.

At 628, optimizer engine 610 optimizes monitoring component 602 by, for example, adjusting one or more metric threshold values, reconfiguring one or more monitoring agents, disabling one or more monitoring agents, and the like. In addition, optimizer engine 610 sends an optimization instruction to analysis engine 604 at 630. At 632, analysis engine 604 sends the generated root cause alert chain to alert engine 608. In turn, alert engine 608 sends the generated root cause alert chain at 634 to alerting component 612 for alerting one or more system administrators via email, page, and/or real-time messaging, for example.

Figure 7:
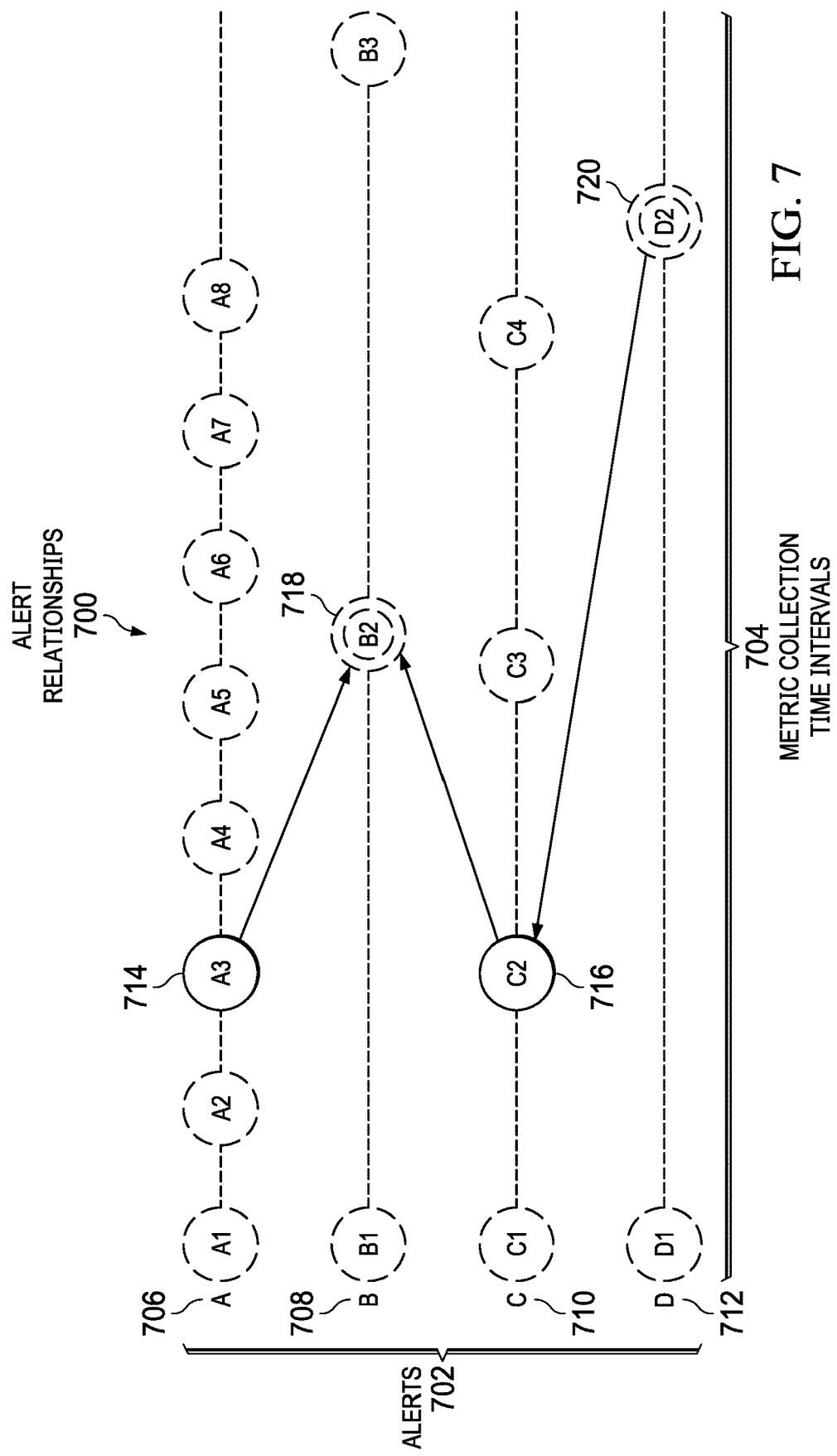
FIG. 7 is a diagram illustrating an example of alert relationships in accordance with an illustrative embodiment.

With reference now to FIG. 7, a diagram illustrating an example of alert relationships is shown in accordance with an illustrative embodiment. Alert relationships 700 represent relationships between dependent alerts found in a root cause dependency table, such as root cause dependency table 524 in FIG. 5. Alert relationships 700 include alerts 702. Metric collection time intervals 704 represent the different metric collection time intervals corresponding to alerts 702.

In this example, alerts 702 include alert A 706, alert B 708, alert C 710, and alert D 712. Also in this example, the metric collection time intervals for alert A 706 are A1 to A8, the metric collection time intervals for alert B 708 are B1 to B3, the metric collection time intervals for alert C 710 are C1 to C4, and the metric collection time intervals for alert D 712 are D1 to D2 for the example time period shown.

In this example, when a metrics collector, such as metrics collector 512 in FIG. 5, triggers alert A at current metric collection time interval A3 714 and alert C at current metric collection time interval C2 716, an analysis engine, such as analysis engine 522 in FIG. 5, may determine that the cloud environment components corresponding to alert B 708 and alert D 712 are encountering issues or problems. However, monitoring agents, such as monitoring agents 514 in FIG. 5, corresponding to these cloud environment components have different metric collection time intervals. In other words, the metrics collector has not yet received metrics for these cloud environment components corresponding to alert B 708 and alert D 712 and, therefore, the metrics collector cannot generate alert B 708 and/or alert D 712. The future metric collection time intervals corresponding to alert B 708 and alert D 712 are B2 718 and D2 720, respectively. As a result, the analysis engine does not know the current status of the cloud components corresponding to alert B 708 and alert D 712. Consequently, a system administrator receiving a notification from the analysis engine at this time would not know whether alert A 706 and alert C 710 are caused by alert B 708 or whether alert D 712 is affected by alert C 710.

Thus, the analysis engine proactively requests current real-time metrics from the monitoring agents corresponding to alert B 708 and alert D 712 before the defined metric collection time intervals (i.e., B2 718 and D2 720) for these monitoring agents to determine the status of the cloud components associated with these monitoring agents. Then, the analysis engine determines what the root cause of alerts A 706 and C 710 are based on the current status of the cloud components corresponding to alert B 708 and alert D 712, respectively. Afterward, the analysis engine generates a root cause alert chain, such as root cause alert chain 528 in FIG. 5, corresponding to the root cause of the alerts. During this analysis process, the analysis engine determines whether one alert is caused one or more other alerts, whether one alert is caused by one or more prior alerts, whether several different alerts correspond to the same cloud component problem, and the like.

Then, the analysis engine sends the generated root cause alert chain to an optimizer engine, such as optimizer engine 530 in FIG. 5. The optimizer engine determines how to optimize the monitoring agents based on the root cause alert chain. For example, the optimizer engine may disable monitoring agents that are triggering duplicate alerts or may change criteria (e.g., thresholds) of alert settings. As a result, the optimizer engine may increase the performance of a server computer, such as server computer 502 in FIG. 5, by decreasing the number of alerts processed by the server and by decreasing the amount of alert noise corresponding to the cloud environment, such as cloud environment 504 in FIG. 5. Further, the optimizer engine optimizes the root cause dependency table by updating the root cause dependency table to reflect the current dependent relationships between generated alerts and their corresponding dependent alerts.

In addition, the analysis engine sends the root cause alert chain to an alert engine, such as alert engine 526 in FIG. 5. In turn, the alert engine sends the root cause alert chain to the alerting component, such as alerting component 510 in FIG. 5, to inform system administrators that certain cloud environment components are encountering issues. The system administrators will then analyze the root cause alert chain to resolve issues and problems within the cloud environment. Also, it should be noted that the server computer, itself, may resolve issues within the cloud environment based on the generated root cause alert chain as well.

Figure 8A:
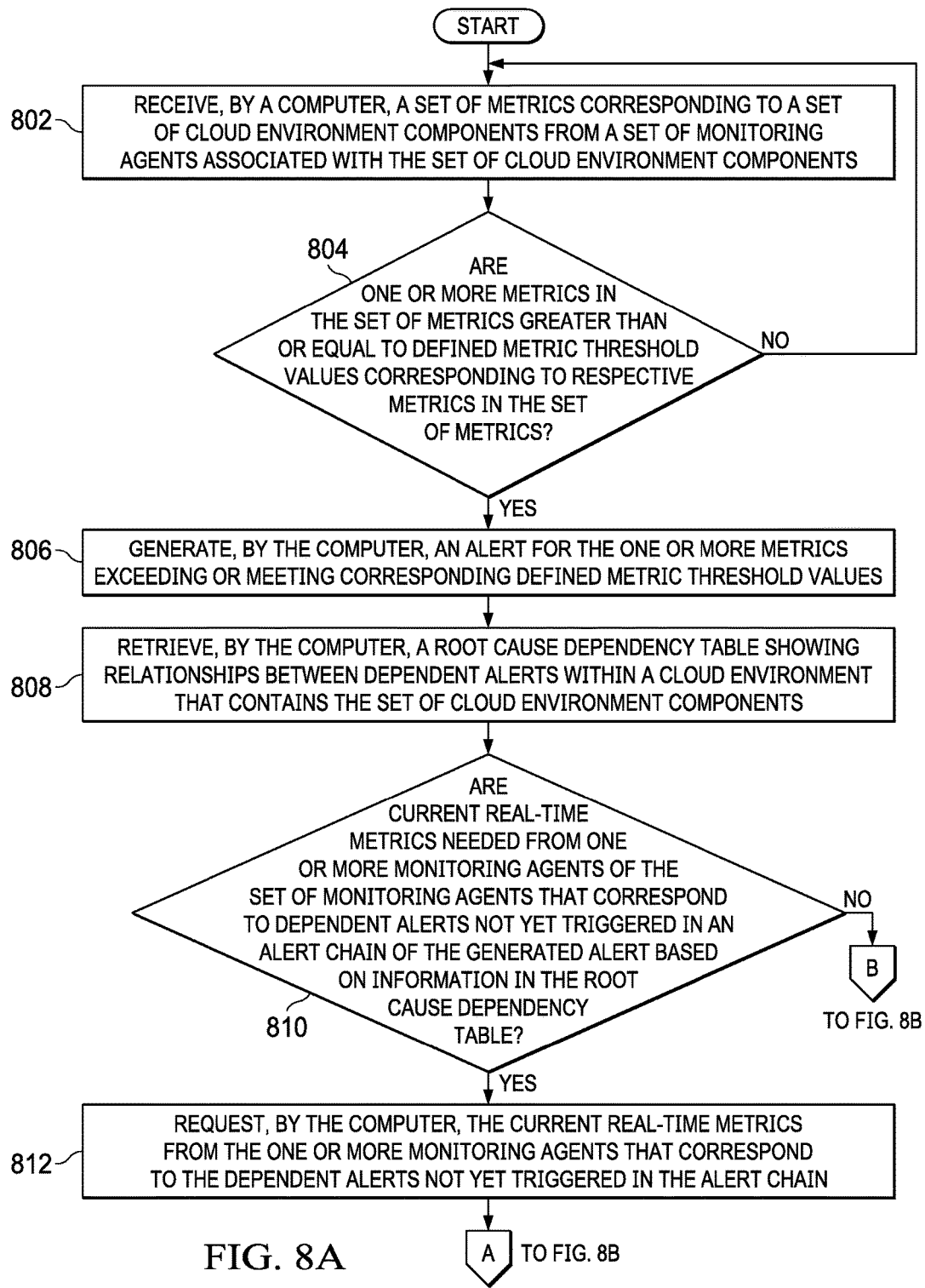
FIGS. 8A-8B are a flowchart illustrating a process for managing real-time monitoring alerts in accordance with an illustrative embodiment.
Figure 8B:
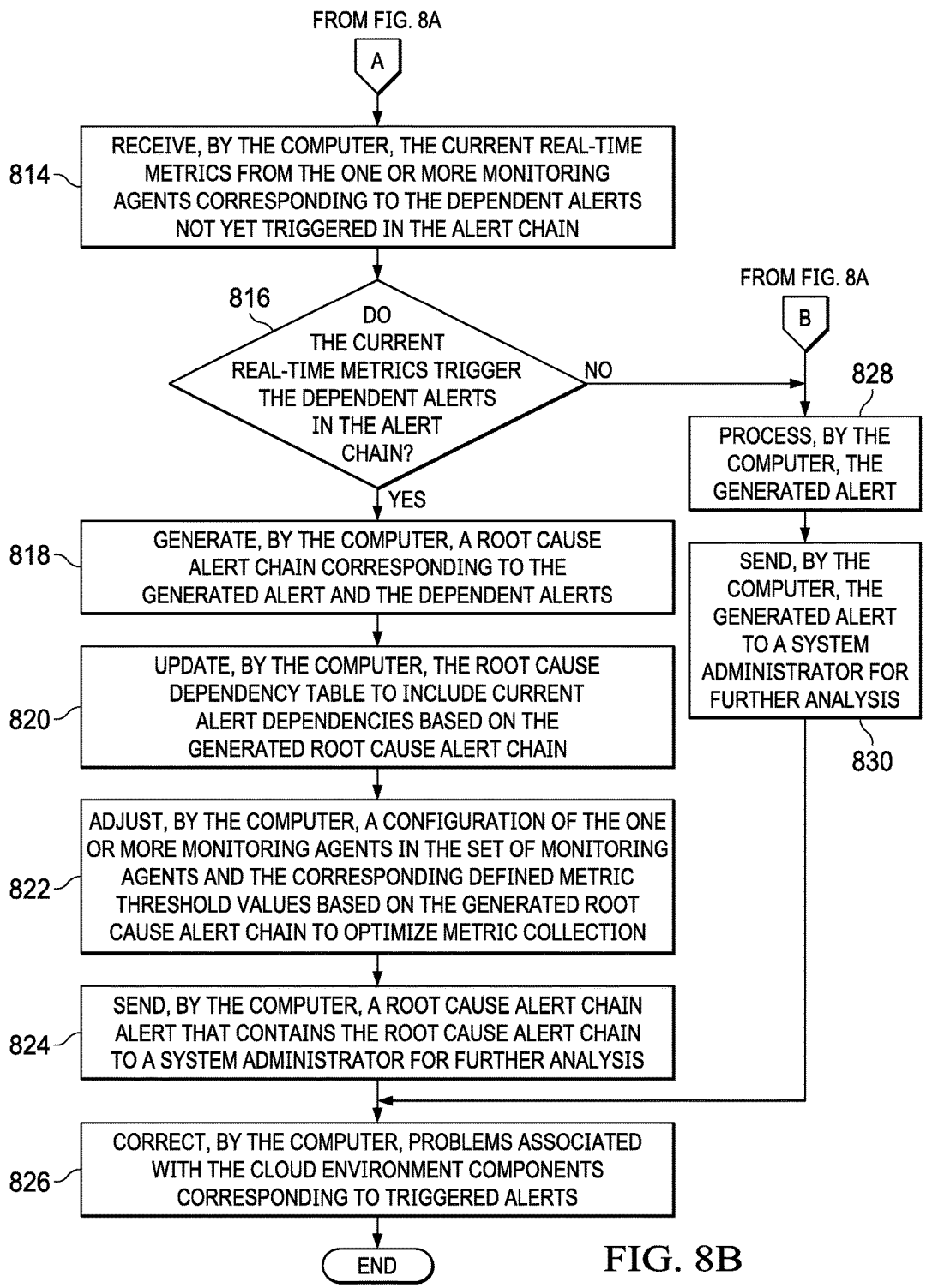

With reference now to FIGS. 8A-8B, a flowchart illustrating a process for managing real-time monitoring alerts is shown in accordance with an illustrative embodiment. The process shown in FIGS. 8A-8B may be implemented in a computer, such as, for example, server 104 in FIG. 1 or data processing system 200 in FIG. 2.

The process begins when the computer receives a set of metrics corresponding to a set of cloud environment components from a set of monitoring agents associated with the set of cloud environment components (step 802). Afterward, the computer makes a determination as to whether one or more metrics in the set of metrics are greater than or equal to defined metric threshold values corresponding to respective metrics in the set of metrics (step 804). If the computer determines that none of the metrics in the set of metrics are greater than or equal to defined metric threshold values corresponding to respective metrics in the set of metrics, no output of step 804, then the process returns to step 802 where the computer continues to receive metrics from the set of monitoring agents. If the computer determines that one or more metrics in the set of metrics are greater than or equal to defined metric threshold values corresponding to respective metrics in the set of metrics, yes output of step 804, then the computer generates an alert for the one or more metrics exceeding or meeting corresponding defined metric threshold values (step 806).

Further, the computer retrieves a root cause dependency table showing relationships between dependent alerts within a cloud environment that contains the set of cloud environment components (step 808). Subsequently, the computer makes a determination as to whether current real-time metrics are needed from one or more monitoring agents of the set of monitoring agents that correspond to dependent alerts not yet triggered in an alert chain of the generated alert based on information in the root cause dependency table (step 810). If the computer determines that no current real-time metrics are needed based on the information in the root cause dependency table, no output of step 810, then the process proceeds to step 828. If the computer determines that current real-time metrics are needed from one or more monitoring agents of the set of monitoring agents that correspond to dependent alerts not yet triggered in an alert chain of the generated alert based on the information in the root cause dependency table, yes output of step 810, then the computer requests the current real-time metrics from the one or more monitoring agents that correspond to the dependent alerts not yet triggered in the alert chain (step 812).

Afterward, the computer receives the current real-time metrics from the one or more monitoring agents corresponding to the dependent alerts not yet triggered in the alert chain (step 814). Then, the computer makes a determination as to whether the current real-time metrics trigger the dependent alerts in the alert chain (step 816). If the computer determines that the current real-time metrics do trigger the dependent alerts in the alert chain, yes output of step 816, then the computer generates a root cause alert chain corresponding to the generated alert and the dependent alerts (step 818).

Furthermore, the computer updates, the root cause dependency table to include current alert dependencies based on the generated root cause alert chain (step 820). Moreover, the computer adjusts a configuration of the one or more monitoring agents in the set of monitoring agents and the corresponding defined metric threshold values based on the generated root cause alert chain to optimize metric collection (step 822). In addition, the computer sends a root cause alert chain alert that contains the root cause alert chain to a system administrator for further analysis (step 824). The computer also corrects problems associated with the cloud environment components corresponding to triggered alerts (step 826). Thereafter, the process terminates.

Returning again to step 816, if the computer determines that the current real-time metrics do not trigger the dependent alerts in the alert chain, no output of step 816, then the computer processes the generated alert (step 828). Further, the computer sends the processed alert to a system administrator for further analysis (step 830). Thereafter, the process returns to step 826 where the computer corrects problems corresponding to triggered alerts.

Thus, illustrative embodiments of the present invention provide a computer-implemented method, computer system, and computer program product for managing real-time cloud environment component monitoring alerts in a chain of alerts, analyzing alerts in the chain to determine a root cause of the alerts having dependent alert relationships, and optimizing a root cause dependency table and a monitoring component corresponding to the cloud environment based on the analysis of the root cause alert chain. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for managing real-time monitoring alerts, the computer system comprising:
   a bus system;
   a storage device connected to the bus system, wherein the storage device stores program instructions; and
   a processor connected to the bus system, wherein the processor executes the program instructions to:
   generate an alert for one or more metrics exceeding corresponding defined metric threshold values;
   retrieve a root cause dependency table showing relationships between alerts;
   determine whether current real-time metrics are needed from one or more monitoring agents that correspond to dependent alerts not yet triggered in an alert chain of the generated alert based on information in the root cause dependency table; and
   request the current real-time metrics from the one or more monitoring agents that correspond to the dependent alerts not yet triggered in the alert chain in response to determining that the current real-time metrics are needed from the one or more monitoring agents that correspond to the dependent alerts not yet triggered in the alert chain of the generated alert based on the information in the root cause dependency table.

2. The computer system of claim 1, wherein the processor further executes the program instructions to:
   determine whether the current real-time metrics trigger the dependent alerts in the alert chain; and
   generate a root cause alert chain corresponding to the generated alert and the dependent alerts in response to determining that the current real-time metrics trigger the dependent alerts in the alert chain.

3. The computer system of claim 2, wherein the processor further executes the program instructions to:
process the generated alert in response to determining that the current real-time metrics do not trigger the dependent alerts in the alert chain; and
send the generated alert to a system administrator.

4. The computer system of claim 2, wherein the generated root cause alert chain identifies current alert dependencies and their corresponding metric collection time sequences.

5. A computer program product for managing real-time monitoring alerts, the computer program product comprising a computer readable storage medium having program instructions embodied therewith, the program instructions executable by a computer to cause the computer to perform a method comprising:
generating, by the computer, an alert for one or more metrics exceeding corresponding defined metric threshold values;
retrieving, by the computer, a root cause dependency table showing relationships between alerts;
determining, by the computer, whether current real-time metrics are needed from one or more monitoring agents that correspond to dependent alerts not yet triggered in an alert chain of the generated alert based on information in the root cause dependency table; and
responsive to the computer determining that the current real-time metrics are needed from the one or more monitoring agents that correspond to the dependent alerts not yet triggered in the alert chain of the generated alert based on the information in the root cause dependency table, requesting, by the computer, the current real-time metrics from the one or more monitoring agents that correspond to the dependent alerts not yet triggered in the alert chain.

6. The computer program product of claim 5 further comprising:
determining, by the computer, whether the current real-time metrics trigger the dependent alerts in the alert chain; and
responsive to the computer determining that the current real-time metrics trigger the dependent alerts in the alert chain, generating, by the computer, a root cause alert chain corresponding to the generated alert and the dependent alerts.

7. The computer program product of claim 5 further comprising:
responsive to the computer determining that the current real-time metrics do not trigger the dependent alerts in the alert chain, processing, by the computer, the generated alert; and
sending, by the computer, the generated alert to a system administrator.

8. The computer program product of claim 5, wherein the generated root cause alert chain identifies current alert dependencies and their corresponding metric collection time sequences.

9. The computer program product of claim 8 further comprising:
updating, by the computer, the root cause dependency table to include the current alert dependencies based on the generated root cause alert chain.

10. The computer program product of claim 8 further comprising:
adjusting, by the computer, a configuration of the one or more monitoring agents and the corresponding defined metric threshold values based on the generated root cause alert chain to optimize metric collection.

11. The computer program product of claim 8 further comprising:
sending, by the computer, a root cause alert chain alert that contains the generated root cause alert chain to a system administrator.

\* \* \* \* \*